(12) United States Patent
Yao et al.

(10) Patent No.: US 8,517,549 B2
(45) Date of Patent: Aug. 27, 2013

(54) LIGHT KEYBOARD

(75) Inventors: Liang-Yu Yao, Taoyuan (TW); Hsuan-Wei Ho, Taoyuan (TW)

(73) Assignee: Darfon Electronics Corp., Gueishan, Taoyuan (TW)

(*) Notice: Subject to any disclaimer, the term of this patent is extended or adjusted under 35 U.S.C. 154(b) by 128 days.

(21) Appl. No.: 13/342,998

(22) Filed: Jan. 4, 2012

(65) Prior Publication Data

US 2012/0170306 A1 Jul. 5, 2012

(30) Foreign Application Priority Data

Jan. 5, 2011 (TW) .............................. 100200151 U (51) Int. Cl.
| | |
|---|---|
| *G01D 11/28* | (2006.01) |
| *H04M 1/22* | (2006.01) |
| *F21V 33/00* | (2006.01) |
| *F21V 7/04* | (2006.01) |
| *H01H 9/00* | (2006.01) |
| *G06F 3/02* | (2006.01) |

(52) U.S. Cl.
USPC .................. 362/23.03; 362/23.04; 362/23.06; 362/23.07; 362/23.14; 362/85; 362/609; 200/313; 200/314; 200/315; 345/170

(58) Field of Classification Search
USPC ............... 362/23.03–23.07, 23.14, 23.16, 85, 362/609; 200/313–315; 345/170
See application file for complete search history.

(56) References Cited

U.S. PATENT DOCUMENTS

| | | | |
|---|---|---|---|
| 6,435,685 B2* | 8/2002 | Matsushita | 362/608 |
| 8,132,940 B2* | 3/2012 | Shimojoh | 362/296.05 |
| 2003/0123248 A1* | 7/2003 | Kim | 362/31 |
| 2010/0214786 A1* | 8/2010 | Nichol | 362/296.01 |

* cited by examiner

*Primary Examiner* — David J Makiya
(74) *Attorney, Agent, or Firm* — Winston Hsu; Scott Margo (57) ABSTRACT

A light keyboard includes a base, a plurality of keyswitches and a backlight module. The keyswitches are disposed on the base. The backlight module includes a light shielding plate, a light guiding plate and a reflecting plate. The light shielding plate is disposed under the base. The light guiding plate is disposed under the light shielding plate. The reflecting plate is disposed under the light guiding plate. The light shielding plate, the light guiding plate and the reflecting plate are stacked with each other so as to form a middle area of the backlight module. An edge of one of the light shielding plate and the reflecting plate is folded and stacked with the other one of the light shielding plate and the reflecting plate so as to form an edge area of the backlight module. The middle area and the edge area are at equal height.

13 Claims, 8 Drawing Sheets

LIGHT KEYBOARD

BACKGROUND OF THE INVENTION

1. Field of the Invention

The invention relates to a light keyboard and, more particularly, to a light keyboard capable of preventing an edge from floating while being pressed.

2. Description of the Prior Art

A keyboard, which is the most common input device, can be found in variety of electronic equipments for users to input characters, symbols, numerals and so on. From consumer electronic products to industrial machine tools are all equipped with a keyboard for purpose of operation.

As technology advances, there are many types of keyboards in use. Users pay much more attention to visual effect of keyboard except basic input function while choosing keyboard. So far a light keyboard has been developed. The light keyboard attracts users in visual effect and can be used in darkness. Therefore, the light keyboard becomes more and more competitive.

Figure 1:
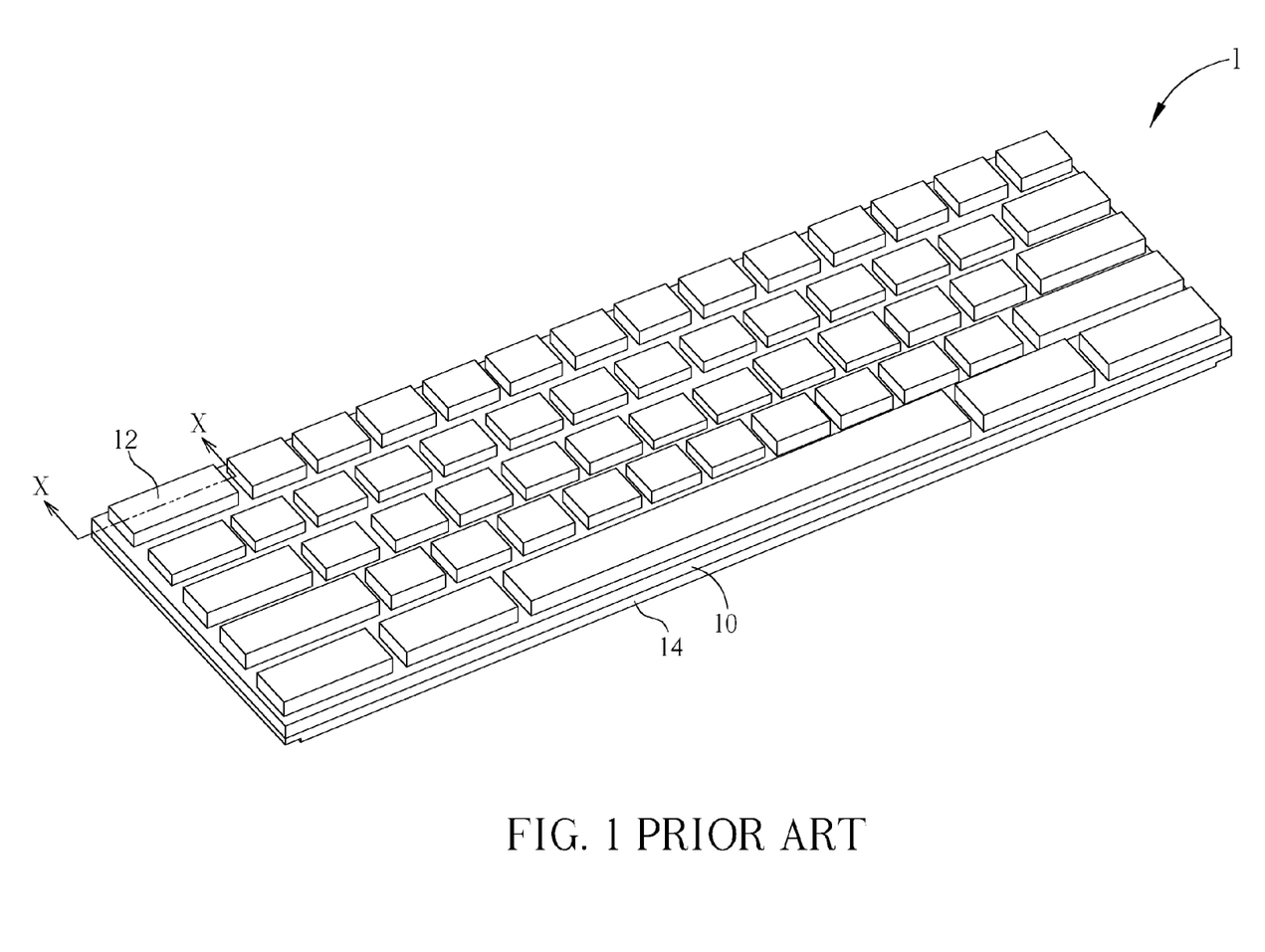
FIG. 1 is a schematic diagram illustrating a light keyboard of the prior art.

Referring to FIG. 1, FIG. 1 is a schematic diagram illustrating a light keyboard 1 of the prior art. As shown in FIG. 1, the light keyboard 1 comprises a base 10, a plurality of keyswitches 12 and a backlight module 14. Each of the keyswitches 12 is disposed on the base 10 for a user to press so as to execute desired function correspondingly. The backlight module 14 is disposed under the base 10 for providing light for the light keyboard 1.

Figure 2:
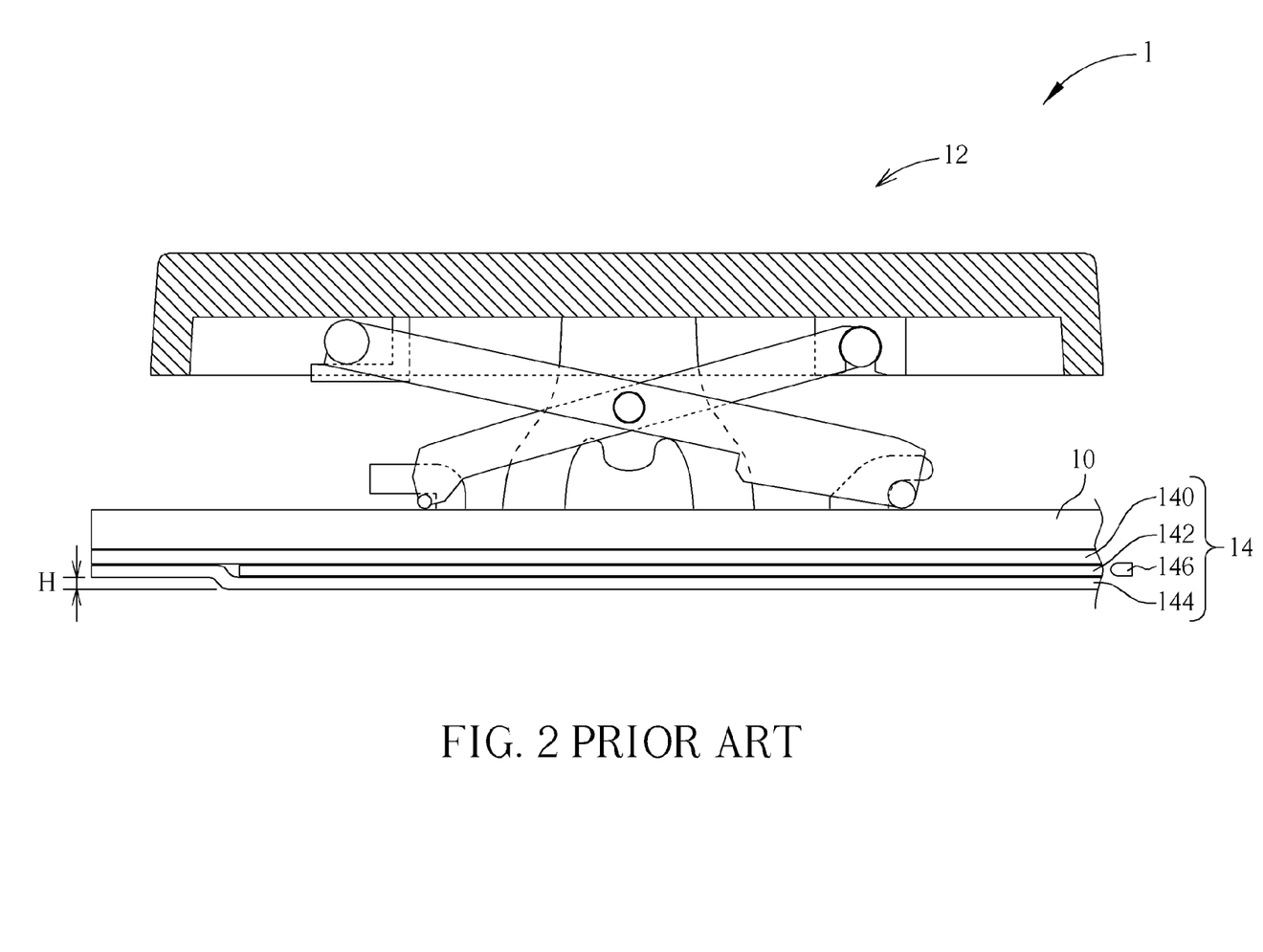
FIG. 2 is a cross-sectional view illustrating the light keyboard along line X-X shown in FIG. 1.

Referring to FIG. 2, FIG. 2 is a cross-sectional view illustrating the light keyboard 1 along line X-X shown in FIG. 1. As shown in FIG. 2, the backlight module 14 comprises a light shielding plate 140, a light guiding plate 142, a reflecting plate 144 and a light emitting unit 146. The light shielding plate 140 is disposed under the base 10. The light guiding plate 142 is disposed under the light shielding plate 140. The reflecting plate 144 is disposed under the light guiding plate 142. The light emitting unit 146 is disposed at one side of the light guiding plate 142 and light emitted by the light emitting unit 146 can be projected toward the base 10 through the light guiding plate 142. To prevent light from leaking out of an edge of the light guiding plate 142, an edge of the reflecting plate 144 is attached to an edge of the light shielding plate 140 tightly so that a height difference H is formed between the edge and the bottom of the reflecting plate 144. When a user presses a keyswitch 12 located at the edge of the light keyboard 1, the light keyboard 1 will float due to the height difference H.

SUMMARY OF THE INVENTION

Therefore, an objective of the invention is to provide a light keyboard capable of preventing an edge from floating while being pressed, so as to solve the aforesaid problems.

According to an embodiment of the invention, a light keyboard comprises a base, a plurality of keyswitches and a backlight module. The keyswitches are disposed on the base. The backlight module comprises a light shielding plate, a light guiding plate and a reflecting plate. The light shielding plate is disposed under the base. The light guiding plate is disposed under the light shielding plate. The reflecting plate is disposed under the light guiding plate. The light shielding plate, the light guiding plate and the reflecting plate are stacked with each other so as to form a middle area of the backlight module. An edge of one of the light shielding plate and the reflecting plate is folded and stacked with another one of the light shielding plate and the reflecting plate so as to form an edge area of the backlight module. The middle area and the edge area are at equal height.

According to another embodiment of the invention, a light keyboard comprises a base, a plurality of keyswitches and a backlight module. The keyswitches are disposed on the base. The backlight module comprises a light shielding plate, a light guiding plate, a reflecting plate and a metal plate. The light shielding plate is disposed under the base. The light guiding plate is disposed under the light shielding plate. The reflecting plate is disposed under the light guiding plate. The metal plate is disposed under the reflecting plate. The light shielding plate, the light guiding plate, the reflecting plate and the metal plate are stacked with each other so as to form a middle area of the backlight module. An edge of the metal plate is folded and stacked with the light shielding plate and the reflecting plate so as to form an edge area of the backlight module. The middle area and the edge area are at equal height.

According to another embodiment of the invention, a light keyboard comprises a base, a plurality of keyswitches and a backlight module. The keyswitches are disposed on the base. The backlight module comprises a light shielding plate, a light guiding plate, a reflecting plate and a metal plate. The light shielding plate is disposed under the base. The light guiding plate is disposed under the light shielding plate. The reflecting plate is disposed under the light guiding plate. The metal plate is disposed under the reflecting plate. The light shielding plate, the light guiding plate, the reflecting plate and the metal plate are stacked with each other so as to form a middle area of the backlight module. An edge of the metal plate is folded and fixed on the base so as to form an edge area of the backlight module. The middle area and the edge area are at equal height.

As mentioned in the above, the invention folds up the edge of the light shielding plate, the edge of the reflecting plate and/or the edge of the metal plate so as to fill in the height difference at the edge of the keyboard of the prior art. Therefore, when a user presses a keyswitch located at the edge of the light keyboard of the invention, the light keyboard can prevent the edge from floating.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
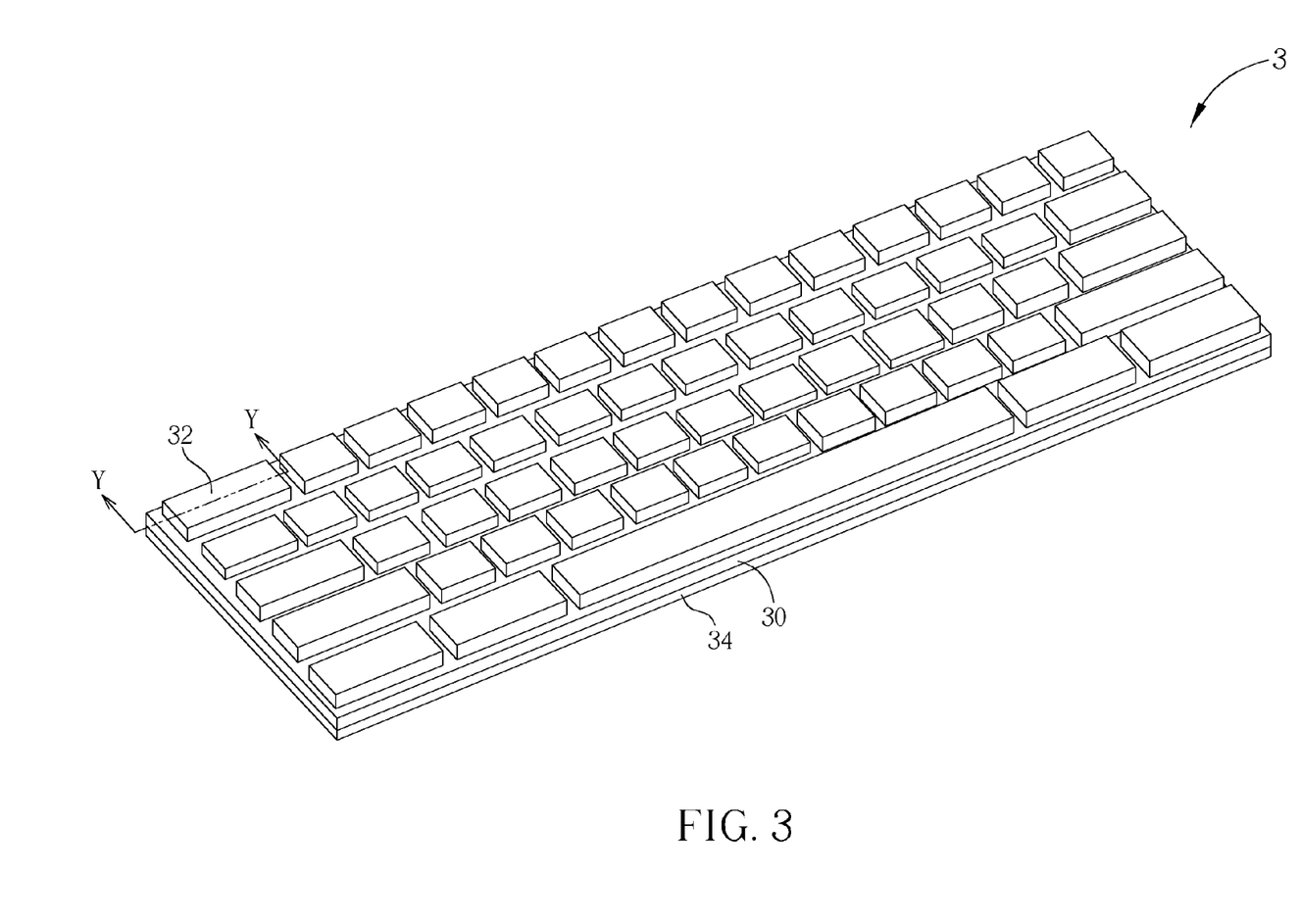
FIG. 3 is a schematic diagram illustrating a light keyboard according to an embodiment of the invention.

Referring to FIG. 3, FIG. 3 is a schematic diagram illustrating a light keyboard 3 according to an embodiment of the invention. As shown in FIG. 3, the light keyboard 3 comprises a base 30, a plurality of keyswitches 32 and a backlight module 34. Each of the keyswitches 32 is disposed on the base 30 for a user to press so as to execute desired function correspondingly. The backlight module 34 is disposed under the base 30 for providing light for the light keyboard 3.

Figure 4:
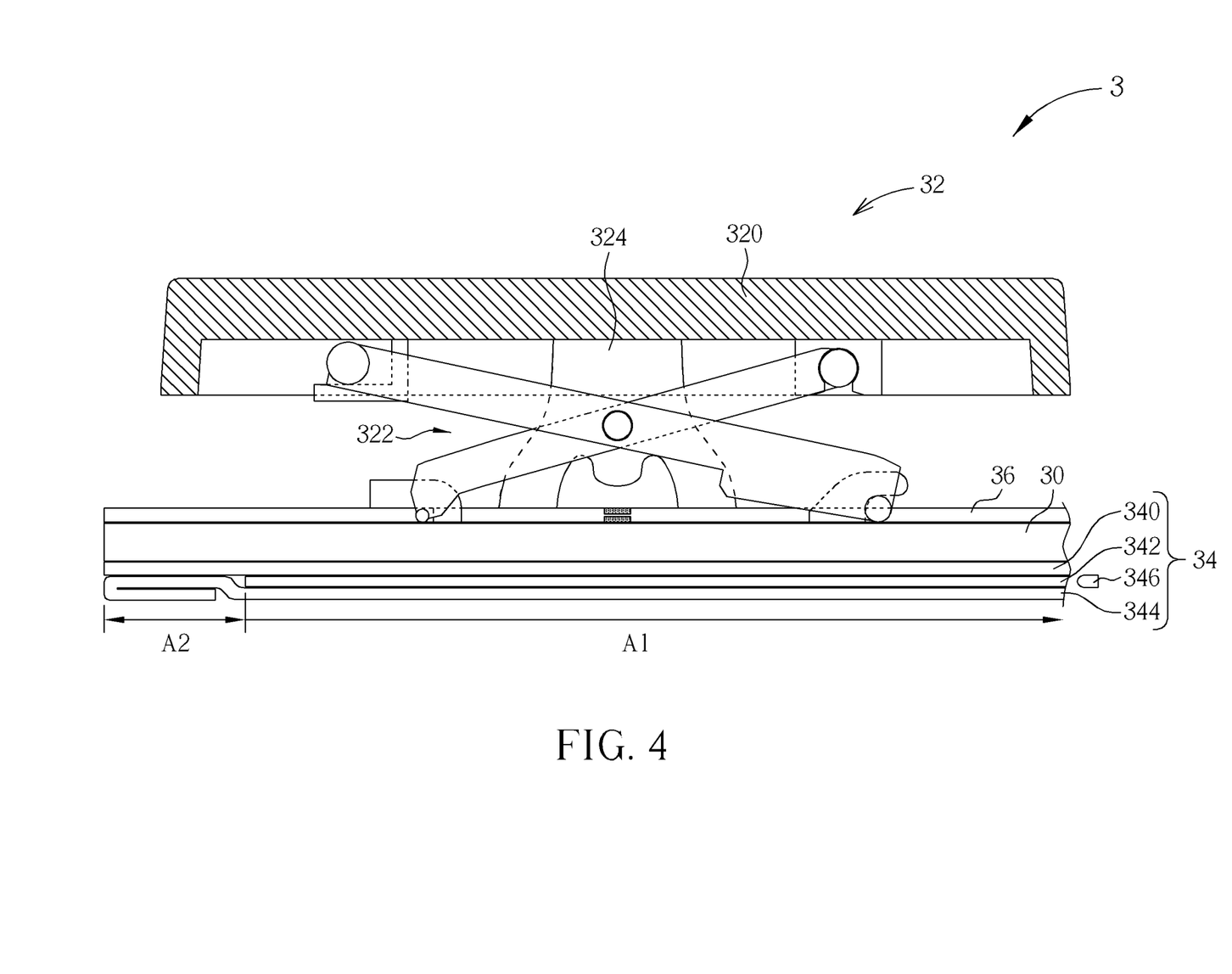
FIG. 4 is a cross-sectional view illustrating the light keyboard along line Y-Y shown in FIG. 3.

Referring to FIG. 4, FIG. 4 is a cross-sectional view illustrating the light keyboard 3 along line Y-Y shown in FIG. 3. As shown in FIG. 4, the light keyboard 3 further comprises a circuit board 36 and the keyswitch 32 comprises a key cap 320, a lift support device 322 and a resilient member 324. The circuit board 36 is disposed on the base 30. The lift support device 322 and the resilient member 324 are disposed between the key cap 320 and the base 30. When the keyswitch 32 is pressed, the key cap 320 will move toward the base 30 along with the lift support device 322. The resilient member 324 is used to provide elastic force while the keycap 320 moves upward and downward with respect to the case 30. The resilient member 324 may be, but not limited to, a rubber dome. The circuit board 36 has a switch corresponding to the keyswitch 32, wherein the switch may be a membrane switch or other trigger-type switch. When the key cap 320 is pressed, the resilient member 324 triggers the switch of the circuit board 36, so as to execute desired function correspondingly.

As shown in FIG. 4, the backlight module 34 comprises a light shielding plate 340, a light guiding plate 342, a reflecting plate 344 and a light emitting unit 346. The light shielding plate 340 is disposed under the base 30. The light guiding plate 342 is disposed under the light shielding plate 340. The reflecting plate 344 is disposed under the light guiding plate 342. The light emitting unit 346 is disposed at one side of the light guiding plate 342 and light emitted by the light emitting unit 346 is projected toward the base 30 through the light guiding plate 342. In practical applications, the light emitting unit 346 may be a light emitting diode. The light shielding plate 340, the light guiding plate 342 and the reflecting plate 344 are stacked with each other so as to form a middle area A1 of the backlight module 34. An edge of the reflecting plate 344 is folded and stacked with the light shielding plate 340 so as to form an edge area A2 of the backlight module 34. As shown in FIG. 4, the middle area A1 and the edge area A2 are at equal height. Therefore, when a user presses the keyswitch 32 located at the edge of the light keyboard 3, the light keyboard 3 can prevent the edge from floating.

Figure 5:
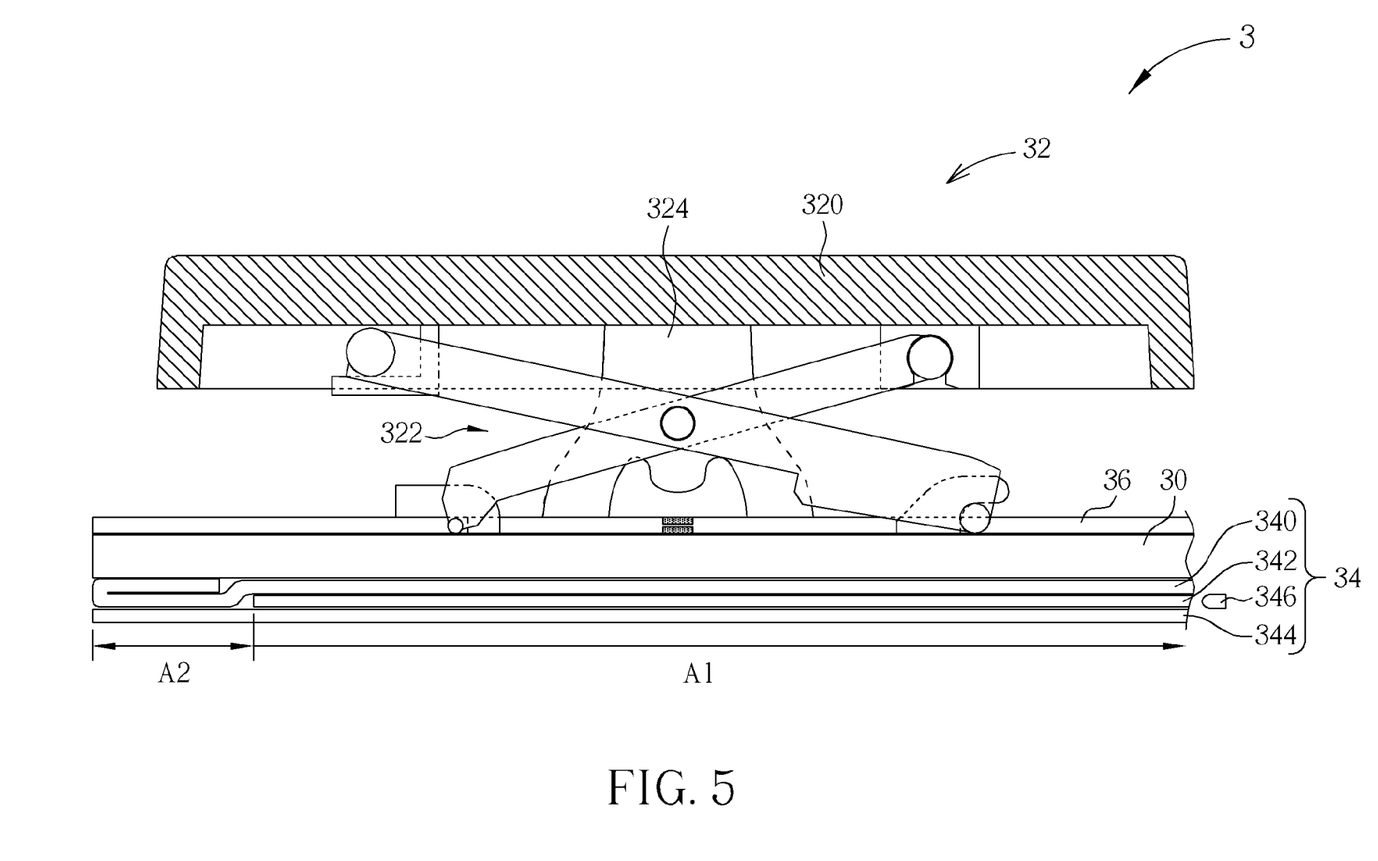
FIG. 5 is a schematic diagram illustrating the light keyboard according to another embodiment of the invention.

Referring to FIG. 5, FIG. 5 is a schematic diagram illustrating the light keyboard 3 according to another embodiment of the invention. As shown in FIG. 5, the main difference between this embodiment and the aforesaid embodiment is that the edge area A2 of the backlight module 34 is formed by folding up an edge of the light shielding plate 340 and then stacking the folded edge of the light shielding plate 340 with the reflecting plate 344. It should be noted that the same elements in FIG. 5 and FIG. 4 are represented by the same numerals, so the repeated explanation will not be depicted herein again.

Figure 6:
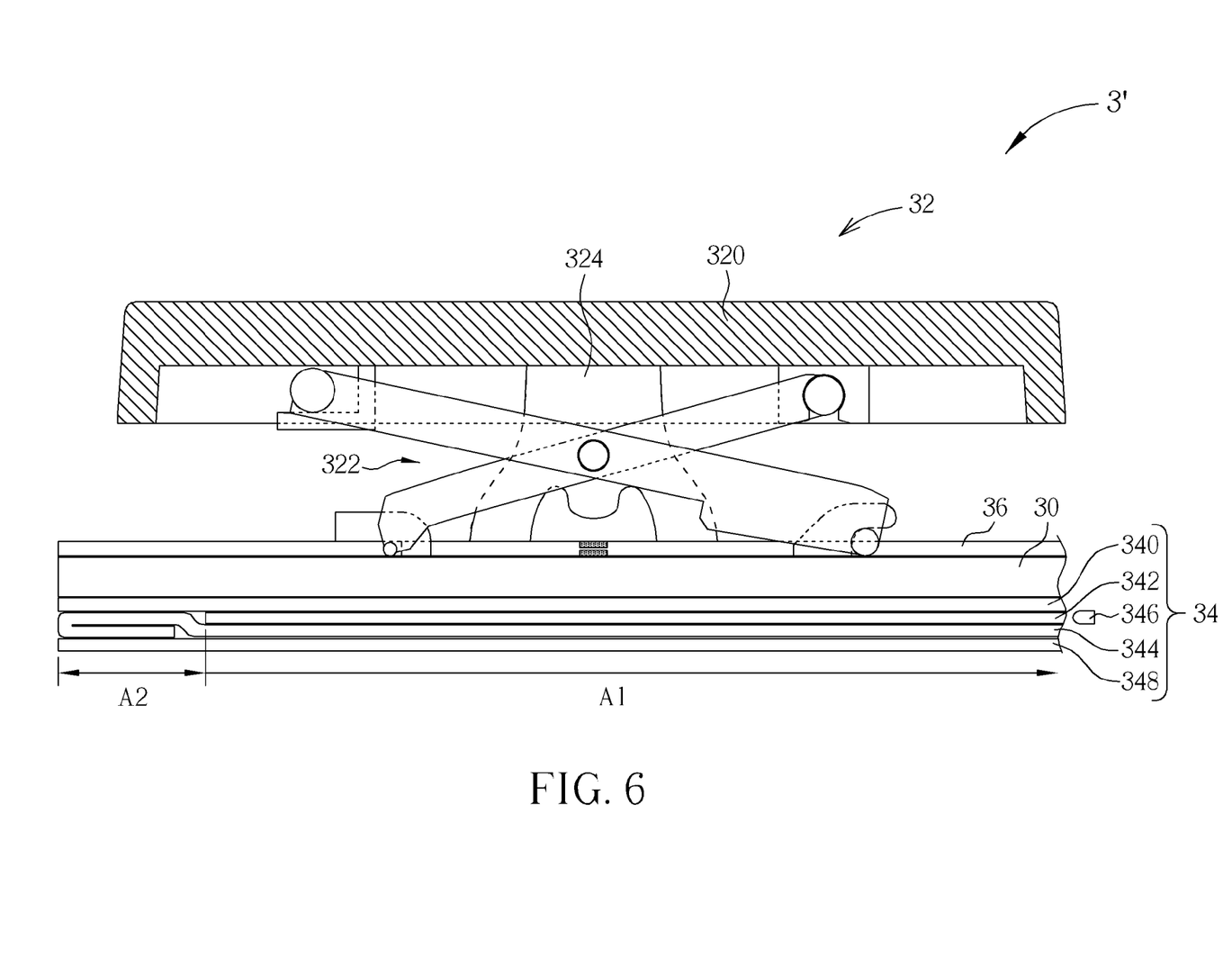
FIG. 6 is a schematic diagram illustrating a light keyboard according to another embodiment of the invention.

Referring to FIG. 6, FIG. 6 is a schematic diagram illustrating a light keyboard 3' according to another embodiment of the invention. As shown in FIGS. 4 and 6, the main difference between the light keyboard 3' and the aforesaid light keyboard 3 is that the backlight module 34 further comprises a metal plate 348 disposed under the reflecting plate 344. In practical applications, the metal plate 348 may be aluminum foil. It should be noted that the same elements in FIG. 6 and FIG. 4 are represented by the same numerals, so the repeated explanation will not be depicted herein again.

Figure 7:
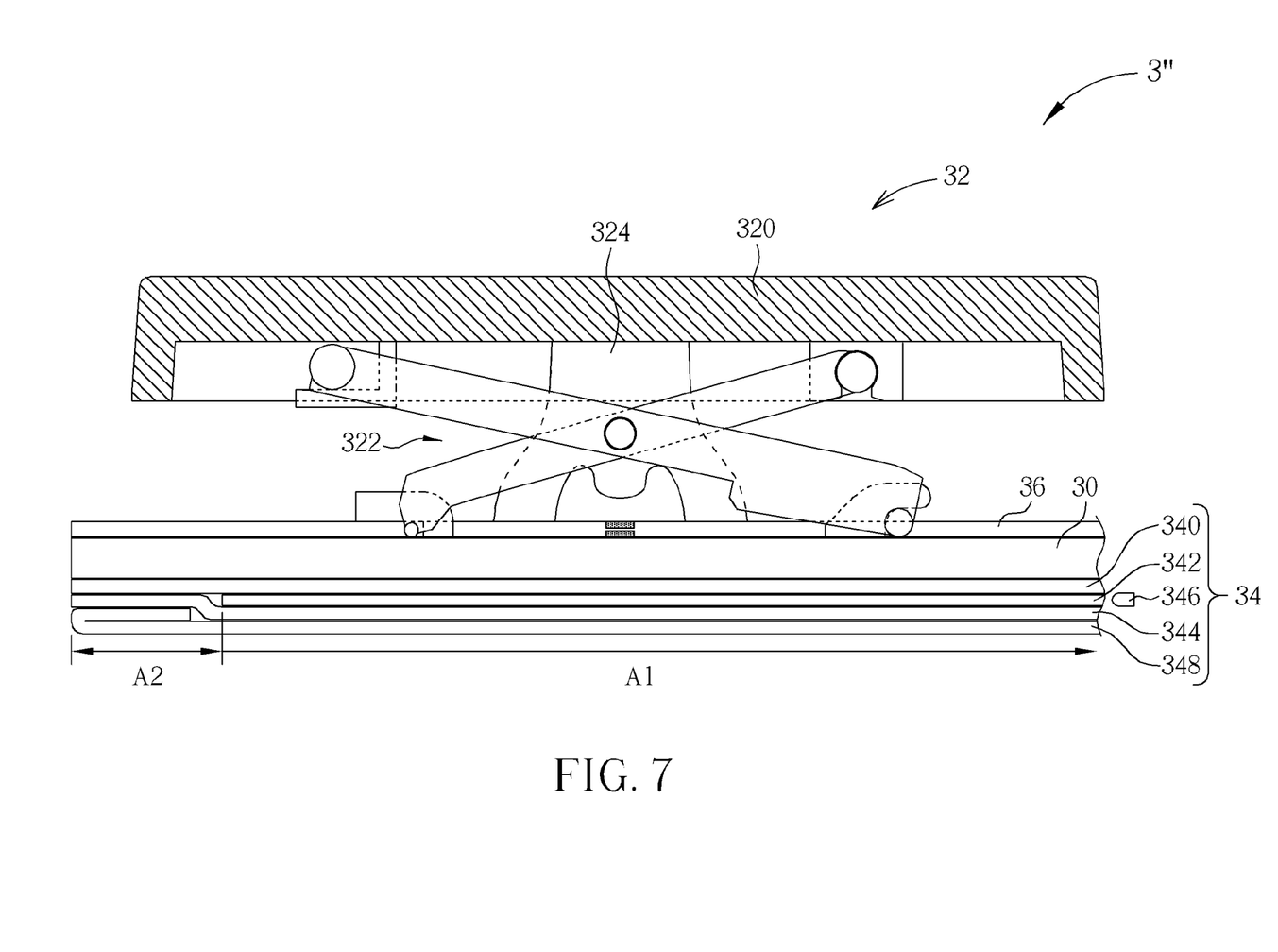
FIG. 7 is a schematic diagram illustrating a light keyboard according to another embodiment of the invention.

Referring to FIG. 7, FIG. 7 is a schematic diagram illustrating a light keyboard 3" according to another embodiment of the invention. As shown in FIGS. 4 and 7, the main difference between the light keyboard 3" and the aforesaid light keyboard 3 is that the backlight module 34 further comprises a metal plate 348 disposed under the reflecting plate 344. In practical applications, the metal plate 348 may be aluminum foil. The light shielding plate 340, the light guiding plate 342, the reflecting plate 344 and the metal plate 348 are stacked with each other so as to form a middle area A1 of the backlight module 34. An edge of the metal plate 348 is folded and stacked with the light shielding plate 340 and the reflecting plate 344 so as to form an edge area A2 of the backlight module 34. As shown in FIG. 7, the middle area A1 and the edge area A2 are at equal height. It should be noted that the same elements in FIG. 7 and FIG. 4 are represented by the same numerals, so the repeated explanation will not be depicted herein again.

Figure 8:
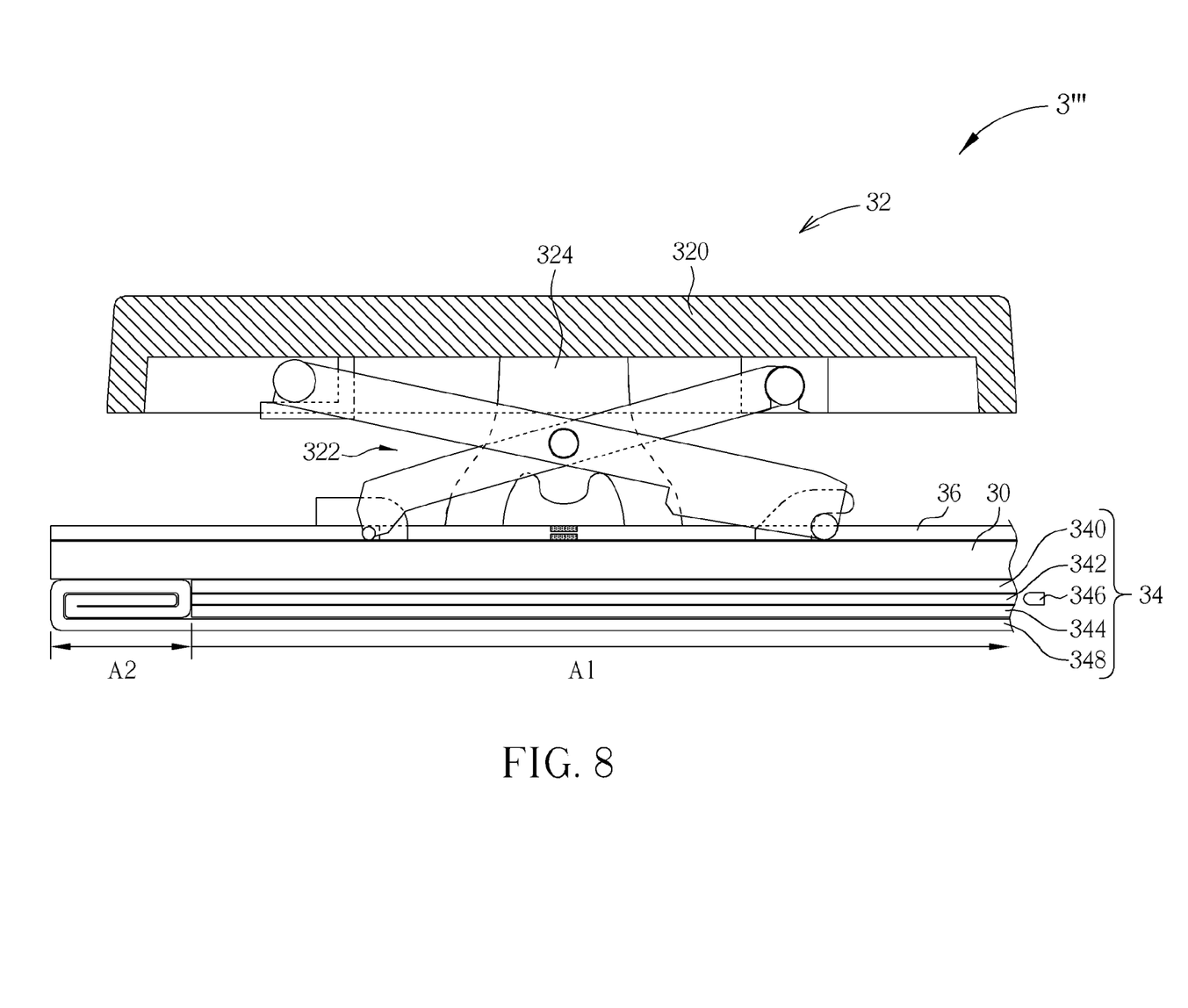
FIG. 8 is a schematic diagram illustrating a light keyboard according to another embodiment of the invention.

Referring to FIG. 8, FIG. 8 is a schematic diagram illustrating a light keyboard 3''' according to another embodiment of the invention. As shown in FIGS. 7 and 8, the main difference between the light keyboard 3''' and the aforesaid light keyboard 3" is that an edge of the metal plate 348 is folded and fixed on the base 30 so as to form an edge area A2 of the backlight module 34. Furthermore, the light shielding plate 340, the light guiding plate 342, the reflecting plate 344 and the metal plate 348 are stacked with each other so as to form a middle area A1 of the backlight module 34. As shown in FIG. 8, the middle area A1 and the edge area A2 are at equal height. In other words, the edge of the metal plate 348 of this embodiment is folded several times so as to make the height of the edge area A2 equal to the height of the middle area A1. It should be noted that the same elements in FIG. 8 and FIG. 7 are represented by the same numerals, so the repeated explanation will not be depicted herein again.

Compared to the prior art, the invention folds up the edge of the light shielding plate, the edge of the reflecting plate and/or the edge of the metal plate so as to fill in the height difference at the edge of the keyboard of the prior art. Therefore, when a user presses a keyswitch located at the edge of the light keyboard of the invention, the light keyboard can prevent the edge from floating.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light keyboard comprising:
   a base;
   a plurality of keyswitches disposed on the base; and
   a backlight module comprising:
      a light shielding plate disposed under the base;
      a light guiding plate disposed under the light shielding plate; and
      a reflecting plate disposed under the light guiding plate;
      wherein the light shielding plate, the light guiding plate and the reflecting plate are stacked with each other so as to form a middle area of the backlight module, an edge of one of the light shielding plate and the reflecting plate is folded and stacked with another one of the light shielding plate and the reflecting plate so as to form an edge area of the backlight module, the middle area and the edge area are at equal height.

2. The light keyboard of claim 1, wherein the backlight module further comprises a metal plate disposed under the reflecting plate.

3. The light keyboard of claim 2, wherein the metal plate is aluminum foil.

4. The light keyboard of claim 1, wherein the backlight module further comprises a light emitting unit disposed at one side of the light guiding plate, light emitted by the light emitting unit is projected toward the base through the light guiding plate.

5. The light keyboard of claim 4, wherein the light emitting unit is a light emitting diode.

6. A light keyboard comprising:
a base;
a plurality of keyswitches disposed on the base; and
a backlight module comprising:
   a light shielding plate disposed under the base;
   a light guiding plate disposed under the light shielding plate;
   a reflecting plate disposed under the light guiding plate; and
   a metal plate disposed under the reflecting plate;
   wherein the light shielding plate, the light guiding plate, the reflecting plate and the metal plate are stacked with each other so as to form a middle area of the backlight module, an edge of the metal plate is folded and stacked with the light shielding plate and the reflecting plate so as to form an edge area of the backlight module, the middle area and the edge area are at equal height.

7. The light keyboard of claim 6, wherein the metal plate is aluminum foil.

8. The light keyboard of claim 6, wherein the backlight module further comprises a light emitting unit disposed at one side of the light guiding plate, light emitted by the light emitting unit is projected toward the base through the light guiding plate.

9. The light keyboard of claim 8, wherein the light emitting unit is a light emitting diode.

10. A light keyboard comprising:
a base;
a plurality of keyswitches disposed on the base; and
a backlight module comprising:
   a light shielding plate disposed under the base;
   a light guiding plate disposed under the light shielding plate;
   a reflecting plate disposed under the light guiding plate; and
   a metal plate disposed under the reflecting plate;
   wherein the light shielding plate, the light guiding plate, the reflecting plate and the metal plate are stacked with each other so as to form a middle area of the backlight module, an edge of the metal plate is folded and fixed on the base so as to form an edge area of the backlight module, the middle area and the edge area are at equal height.

11. The light keyboard of claim 10, wherein the metal plate is aluminum foil.

12. The light keyboard of claim 10, wherein the backlight module further comprises a light emitting unit disposed at one side of the light guiding plate, light emitted by the light emitting unit is projected toward the base through the light guiding plate.

13. The light keyboard of claim 12, wherein the light emitting unit is a light emitting diode.

* * * * *